Figure 1:
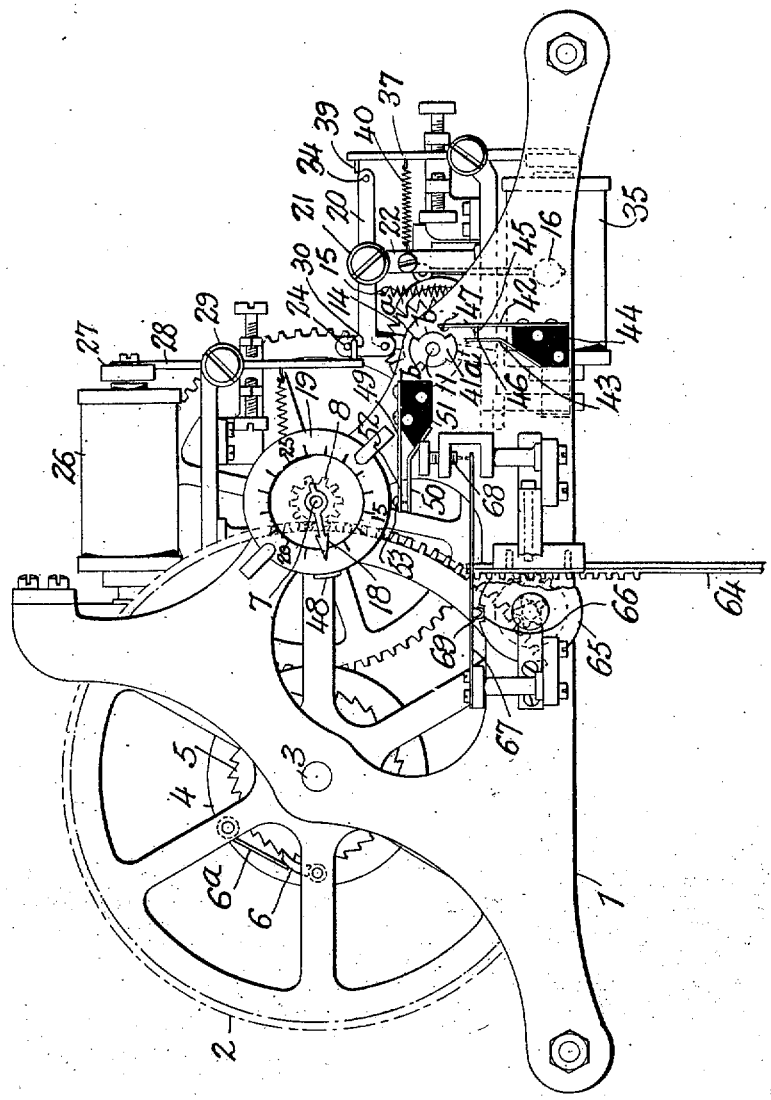

No. 884,592.

PATENTED APR. 14, 1908.

J. S. KENNEDY.
PRESSURE GAGE.
APPLICATION FILED MAY 4, 1906.

6 SHEETS—SHEET 1.

WITNESSES:
James F. Duhamel
C. B. Schroeder

INVENTOR
James S. Kennedy,
BY Fred G. Coker,
ATTORNEY

No. 884,592. PATENTED APR. 14, 1908.
J. S. KENNEDY.
PRESSURE GAGE.
APPLICATION FILED MAY 4, 1906.
6 SHEETS—SHEET 5.
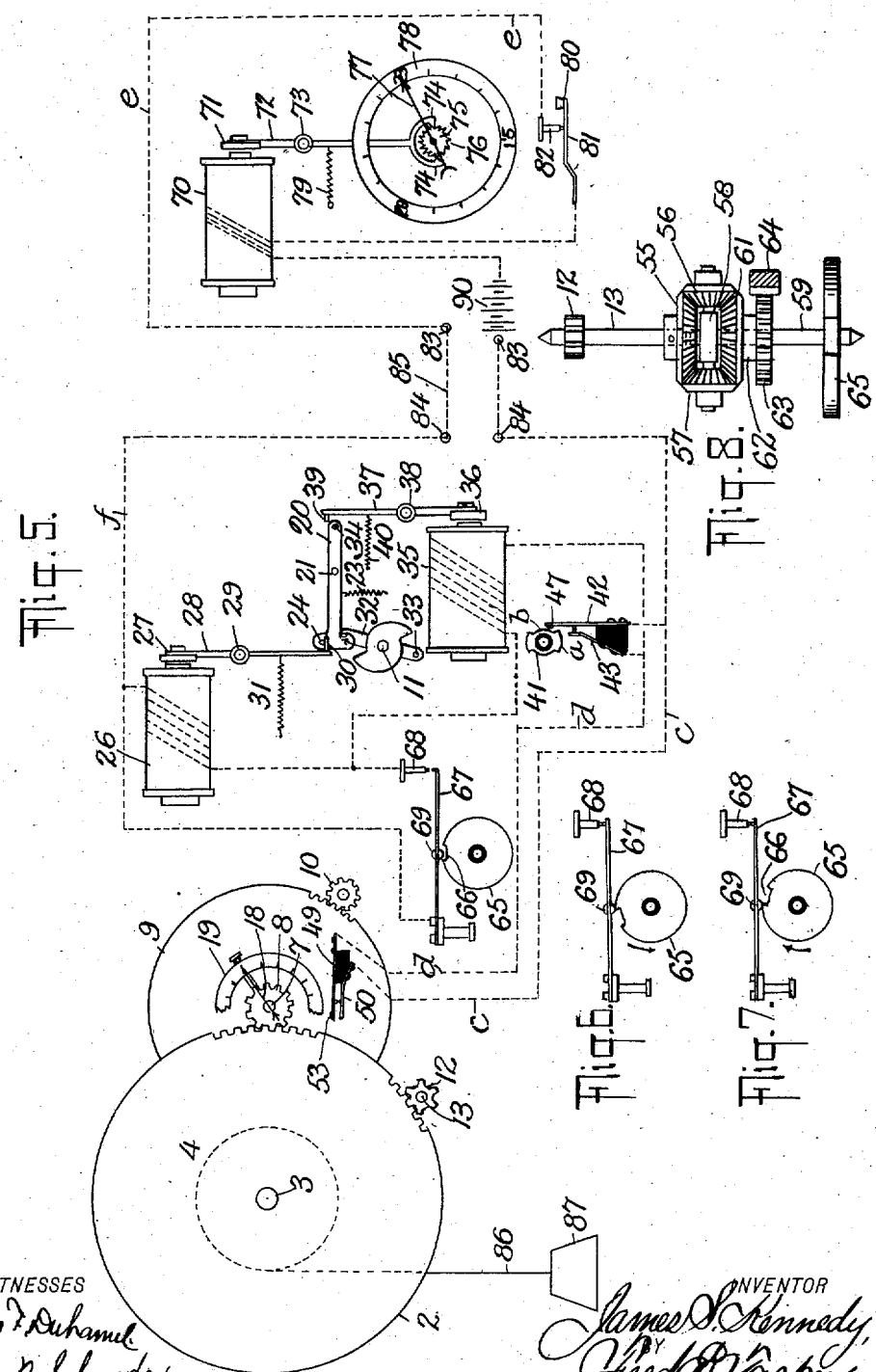
WITNESSES
INVENTOR
James S. Kennedy,
BY
ATTORNEY No. 884,592.
PATENTED APR. 14, 1908.
J. S. KENNEDY.
PRESSURE GAGE.
APPLICATION FILED MAY 4, 1906.
6 SHEETS—SHEET 6.
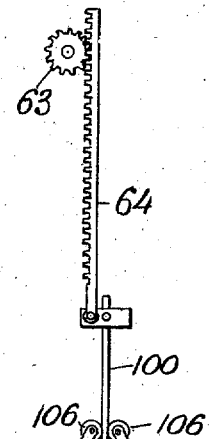
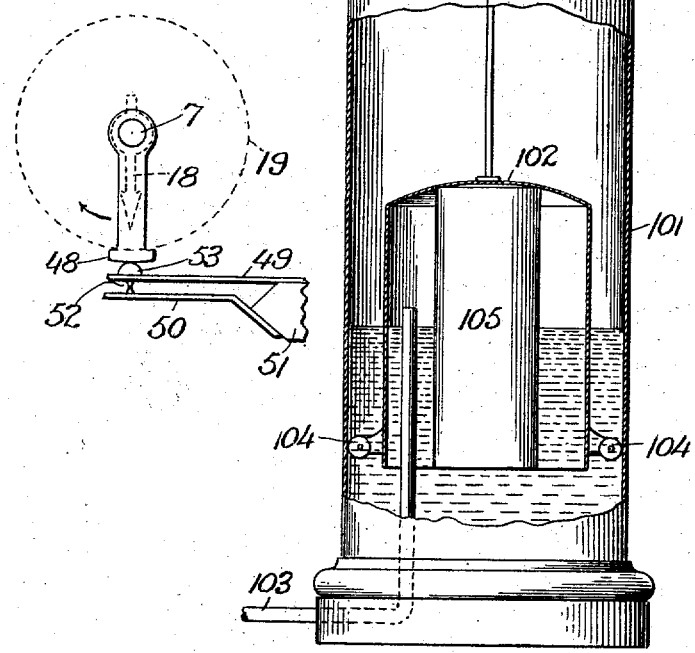
WITNESSES
James F. Duhamel
C. B. Schroeder.
INVENTOR
James S. Kennedy,
BY Fred G. Packer.
ATTORNEY.

UNITED STATES PATENT OFFICE.

JAMES S. KENNEDY, OF NEW YORK, N. Y.

PRESSURE-GAGE.

No. 884,592.   Specification of Letters Patent.   Patented April 14, 1908.

Application filed May 4, 1906. Serial No. 315,256.

*To all whom it may concern:*

Be it known that I, JAMES S. KENNEDY, a citizen of the United States of America, and a resident of the city, county, and State of New York, have invented certain new and useful Improvements in Pressure-Gages, of which the following is a specification.

This invention relates to a pressure gage for giving indications of pressure at long distances from the point of origin, the pressure to be measured being that of gas or any other fluid or liquid. It may also be used for indicating variations in temperature.

The invention includes an electrical apparatus whereby pressure fluctuations can be electrically transmitted automatically to any distance.

In the present description I shall consider more particularly the function of the invention for use with gas pressure, because primarily the invention is intended for use in conjunction with the distribution of gas for illuminating, heating and cooking uses, though this is only one of the numerous purposes for which it may be successfully employed, and the fact that I describe this application so minutely does not in any way signify that its application is not very broad.

In distributing gas to the consumers in a large city, the regulation of the pressure at which the gas is delivered to the consumer is a very important matter. The pressure is commonly given to the gas by the weight of the gas-holders or tanks in which the gas is stored, and is regulated by suitable governors, and the pressure given to the gas at the point of supply must be varied at different hours of the day to meet the variation in the consumption demanded, which variation is quite considerable owing to the change in the quantity consumed at different hours for cooking, lighting, and on cloudy days, or during short absences of the sun due to storm conditions which require artificial light, etc., etc., the object had in view all the time by those controlling the gas supply being to give the consumer a constant or nearly constant pressure. My invention enables this to be attained because its mechanism constantly advises the attendant in charge of the governor at the holder or initial point, regarding what the pressure of the gas is at the distant point where consumption is taking place, which in a city like New York is often two miles or more from the initial point, so that said attendant by properly regulating the governor may have complete control of the pressure at the distant point and keep the same constant or nearly constant at all times and under all conditions.

It has been found in experience that a long distance pressure gage for doing the kind of work to be performed by my present invention ought to have the following characteristics: first, simplicity of apparatus so that the parts may be as few in number as possible and not complex; second, system to be automatic so that every change in pressure may be promptly indicated in a suitable manner; third, a single electrical circuit; fourth, the measurements of pressure to be indicated by visual means or audible means, or both; fifth, the two ends of the apparatus, *i. e.*, the point of pressure origin and the point whose pressure is being noted to have their mechanisms operating always in unison, even to the extent that should the main circuit or battery be rendered inoperative, the mechanisms will upon a restoration of normal conditions immediately indicate the existing pressure no matter what changes of pressure may have intervened while the machine was out of order; sixth, means for verifying the accuracy of the readings or indications at the supply point so as to absolutely safe-guard against any mistake and obviate the necessity for frequent comparisons by telephone, messenger, or otherwise; seventh, some kind of audible notification when a change of pressure takes place, so that the attention of the attendant may immediately be attracted; eighth, some means for automatically indicating that the device is out of order whenever any contingency occurs like the breaking of a conductor to render the machine temporarily inoperative; ninth, when clockwork is employed to drive the machine or a part of it, it should require winding not oftener than once a day and preferably not oftener than once in several days; tenth, absence of reversals of polarity and changes of current strength requiring polarized relays, local batteries, etc.

With these and other objects in view, my invention consists essentially in the construction, arrangement and combination of parts and in varous details and peculiarities thereof substantially as will be hereinafter described and then more fully pointed out in the claims.

Figure 2:
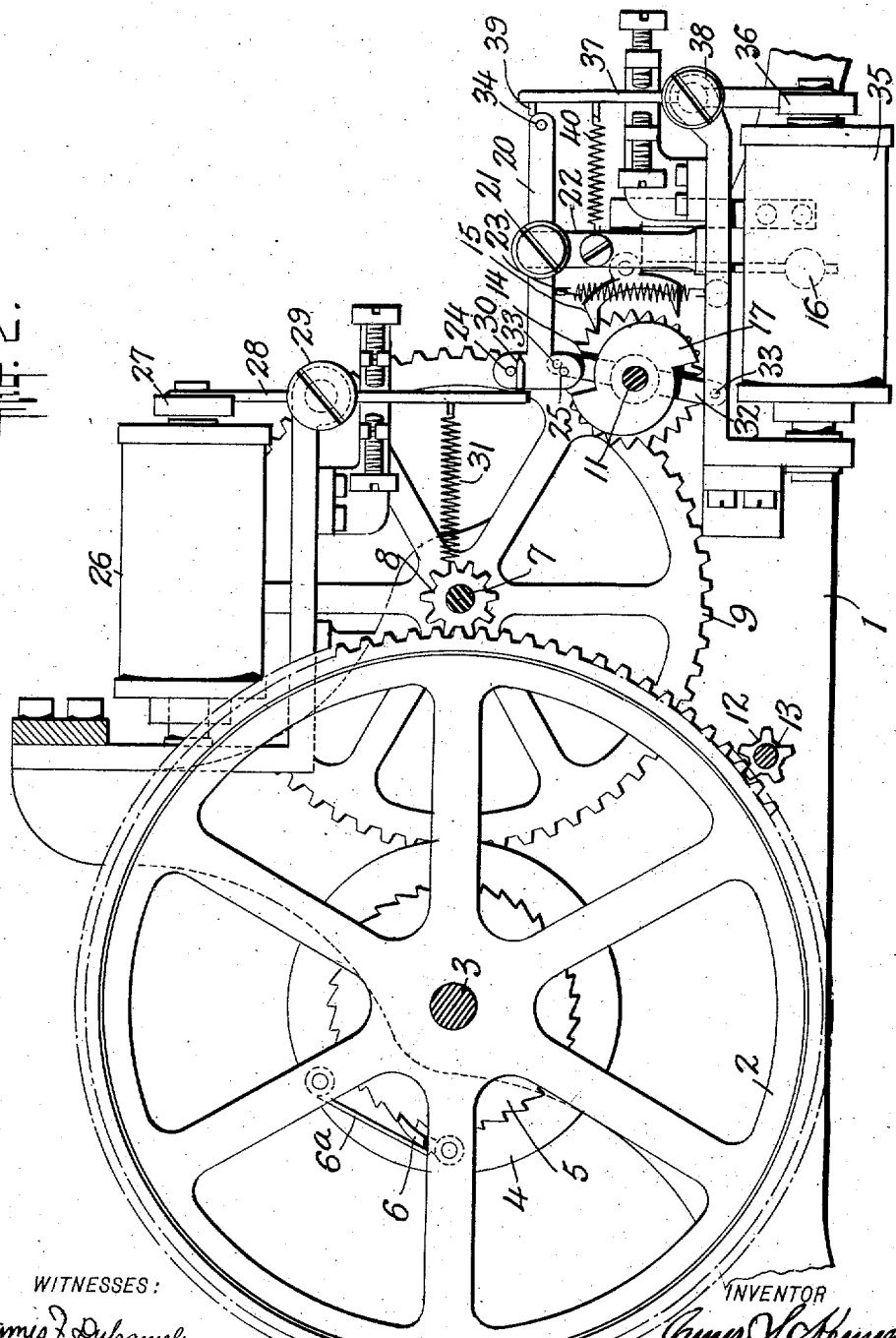
Figure 3:
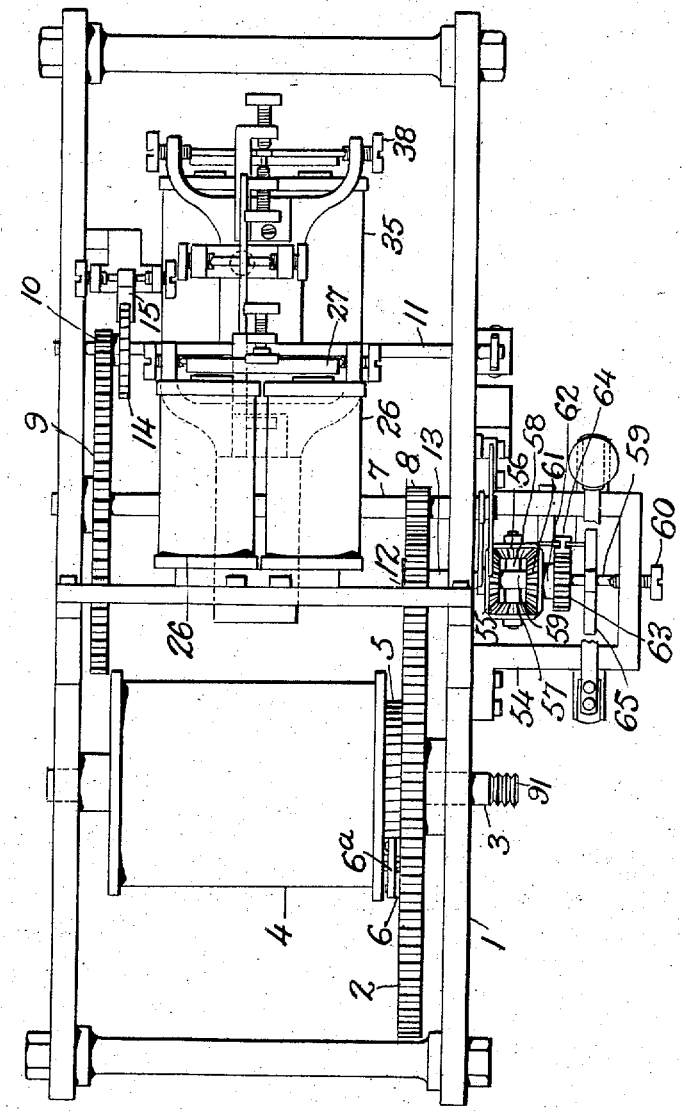
Figure 4:
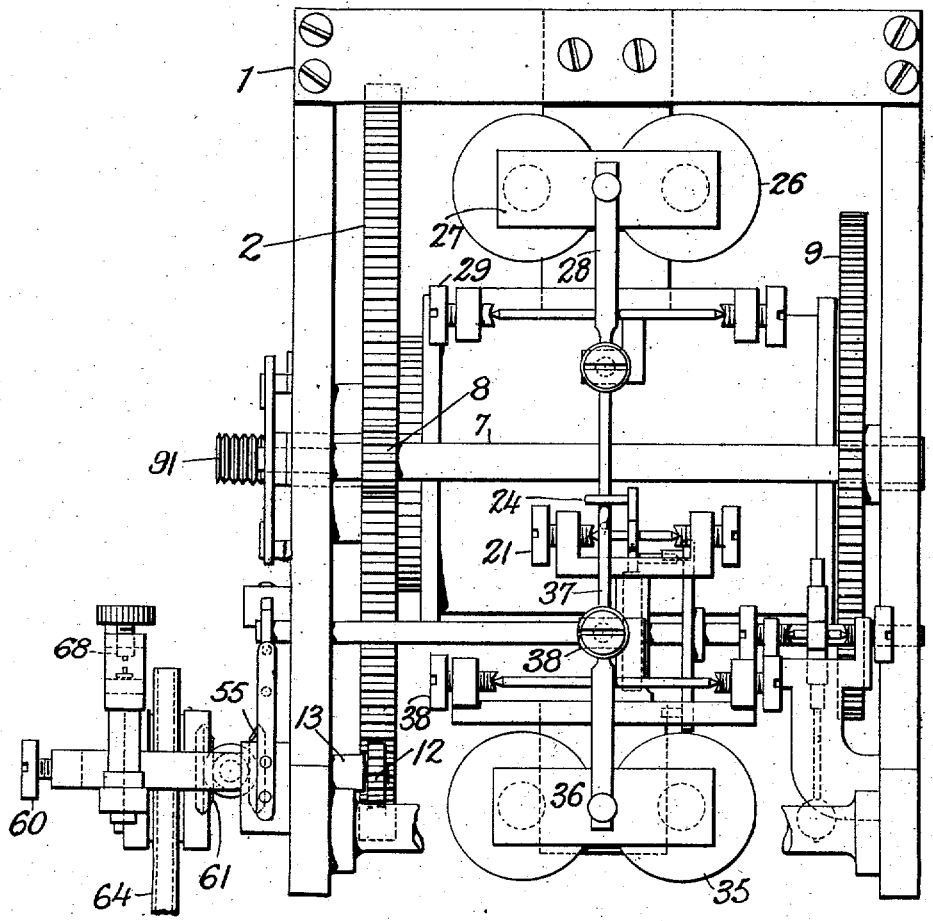

In accompanying drawing illustrating my invention: Figure 1 is a side elevation of the transmitting mechanism. Fig. 2 is an enlarged longitudinal sectional view of the same. Fig. 3 is a top plan view. Fig. 4 is an enlarged end elevation. Fig. 5 is a diagrammatic view of the transmitter mechanism, the receiver mechanism and the electrical connections. Fig. 6 is a detail outline view showing the notched disk in a different position from that which it occupies in Fig. 5. Fig. 7 is a view similar to Fig. 6 but showing the notched disk in a still different position. Fig. 8 is a detail view of the differential gear device. Fig. 9 is a vertical sectional view in detail of one form of tank through which the fluid pressure acts upon a portion of the mechanism. Fig. 10 is a detail view of certain parts.

Similar numerals represent corresponding numbers throughout the different figures of the drawing.

The invention comprises essentially a transmitting mechanism which I term a "transmitter," which is situated at some point distant from the gas supply, that is to say, at the point of gas consumption; and a receiver or indicator mechanism which in the present description of the invention I term a "receiver," which is located in proximity to the gas supply; and a "main line" consisting of an electrical conductor between the receiver and the transmitter, which conductor may be a metallic circuit, or it may have a return through the earth. The transmitter is provided with a dial, though this is not essential; the receiver is also provided with a dial; and both dials have hands or pointers the movements of which are synchronous. The transmitter dial when one is used has one more graduation than the receiver dial, so that there may be one point on the receiver dial equal to two points on the transmitter dial, to provide a pause in the movement of the receiver hand. As one example, the transmitter dial has sixteen graduations and the receiver fifteen, and in each case the workings preferably run from 15 to 29, instead of from zero to 15.

In Fig. 5 we see the transmitter dial 19 having a hand 18, and the receiver dial 78 having a hand 77. An electric circuit is established between the receiver and transmitter. That portion of the circuit belonging to the receiver is shown in dotted lines at *e* and has its terminals at 83, 83; that portion belonging to the transmitter is shown in dotted lines at *f* and has its terminals at 84, 84. Between these terminals 83 and 84 runs the main line 85 which may be several miles in length. The battery 90 or other source of electromotive force may be located at any point in the circuit, either at the receiving end, the transmitting end, or some point between the two.

I will first describe the transmitter. Its main frame 1 is constructed in any suitable manner to accommodate therewith the various mechanical parts, one example of the same being indicated in Figs. 1 and 2, where it is seen to have a substantially rectangular shape, and among various parts to have two vertical sides to permit the journaling therein of certain parallel horizontal shafts. 3 denotes one of these shafts supported at each end in the sides of the frame 1 and carrying a gear wheel 2, a ratchet-wheel 5 having a pawl 6 which is pressed into the teeth of the ratchet by means of a spring 6ª, and also a drum 4 around which is wound a cord 86 attached to a weight 87 (see Fig. 5), the function of the weight being to revolve the drum, the shaft 3, and the gear wheel 2 whenever the condition of certain other parts permits, as will be hereinafter more fully explained. Parallel to the shaft 3 and likewise journaled in the sides of frame 1 is a shaft 7. On it is a pinion 8 which is engaged by the gear-wheel 2. Shaft 7 also carries, preferably at the end opposite where the pinion 8 is located, a gear wheel 9. Also parallel to the shafts 3 and 7 is a third shaft 11 likewise journaled in the sides of the frame 1, and carrying a pinion 10 which is in mesh with the teeth of the gear wheel 9. Gear wheel 9 on shaft 7 has eight times as many teeth as the pinion 10 on shaft 11, and consequently the shaft 11 will revolve eight times while the shaft 7 is revolving once. The gear wheel 2 in addition to engaging the teeth of the pinion 8 engages also the teeth of the pinion 12 on the end of the short shaft 13, see Figs. 2 and 4. Said pinion 12 has one-half as many teeth as the pinion 8, and hence the shaft 13 will revolve twice while the shaft 7 is revolving once; and, carrying this explanation further, it will be seen that the shaft 13 will revolve twice while the shaft 11 is revolving eight times, or once in four revolutions of shaft 11. Also, the shaft 7 carries a hand or pointer 18 which moves over a small graduated circle 19 held stationary by suitable means on the side of frame 1. See Fig. 1. This dial 19 is provided with sixteen graduation marks which divide it into 16 equal divisions, and, although this dial is not necessary to the correct operation of the machine, provides a handy and convenient means for inspecting or testing the operation. The division points are preferably numbered from 15 to 29 except that the number 15 applies to two of them.

On the shaft 11 is mounted an escapement wheel 14, and contiguous thereto is arranged an escapement 15 having a pendulum 16 and used for the purpose of checking the movement of the shaft 11 when the latter is set free. Also, on shaft 11 is a cam 17 having two high and two low points, making it in effect a double cam. Above this cam is a T-shaped latch 20 which swings on a pivot 21 supported on some stationary part 22 of the main frame. The T-shaped end of this latch is normally given a downward tendency by means of a spiral spring 23 which is fastened to the latch at a short distance from its pivot 21, and at the other end is fastened to some stationary part of the frame. The latch 20 rises and falls under the action of the cam 17 revolving beneath it, and hence is made to rise and fall twice in each revolution of the shaft 11 on which cam 17 is mounted. The T-shaped end of the latch 20 is also provided with two pins, one of which, 24, projects horizontally on one side near the upper end of the T-bar, while the other, 25, projects horizontally on the other side near the lower end of the T-bar.

In the upper portion of the main frame 1 above the shaft 11, is an electro-magnet 26 having an armature 27 provided with a lever 28 pivoted at 29 to the main frame, and carrying at its lower end a pin 30, which at times projects beneath the latch pin 24 and hangs up the latch by allowing said pin to rest thereon. A spring 31, fastened to the lever 28, pulls the armature 27 away from magnet 26 when the latter is demagnetized, the result of which pulling away withdraws the pin 30 from beneath the latch pin 24. This magnet 26 is a control magnet, controlling through its armature and the latch 20 the rotation of shaft 11.

On the shaft 11, preferably adjoining cam 17, is a double crank arm 32, provided at each end with a horizontally projecting pin 33. When the latch 20 is hung up so that its pin 24 rests on the armature pin 30, the lower latch pin 25 will bear against one of the crank pins 33, and thus the crank will be locked and the shaft 11 prevented from revolving. The shaft 11 is always given a tendency to revolve by the action of the weight 87 below the drum 4, and the inter-action of the gears resulting therefrom, but it is manifest that as long as the latch is suspended on the electro-magnet armature lever 28, a condition which obtains so long as the control magnet is energized, the shaft 11 cannot move but must of necessity remain stationary, the path of the crank-pin 33 being blocked by the latch-pin 25; but the moment the magnet 26 ceases to attract its armature 27, the spring 31 will withdraw the pin 30 from beneath the pin 24, which will cause the T-shaped end of latch 20 to fall, thereby causing the latch-pin 25 to move out of the way of crank-pin 33, wherefore it will result that there being no longer any obstacle to the movement of the crank 32, and the shaft 11 being under the influence of the weight, said shaft 11 will revolve. We have already seen, however, that the shape of the cam 17 causes the latch 20 to lift again immediately after it falls, and consequently if the magnet 26 becomes again energized after shaft 11 has rotated a quarter of a revolution, and as a result thereof again attracted its armature 27, it will project the pin 30 beneath the pin 24, which by this time has lifted high enough to allow said pin 30 to come underneath it. This action will consequently hang up the latch 20 and thus the shaft 11 will be stopped after it has made a half a revolution. However, if the magnet 26 is not thus again promptly energized, and accordingly remains inoperative, the latch 20 will simply rise and fall under the influence of the double cam 17, the pins 33 on the crank clearing each time the pin 25 on the latch, and the shaft 11 being allowed to continue to revolve until the magnet 26 is again energized and the latch suspended in its upper position in consequence. It is clear that in order to allow the shaft 11 to revolve in the manner just explained, while the magnet 26 is inoperative, the positions of the double cam 17 and the double crank arm 32 on the shaft 11 with respect to each other, must be such that the T-shaped end of the latch 20, after leaving the high points of the periphery of cam 17, will have room to drop and allow the pin 25 to pass under and clear the crank pins 33.

The construction and relative location and adjustment of the various parts will effectually prevent the pin 24 from catching under the pin 30 at any time, as will be clearly understood from the following very brief explanation. Pin 24 obviously moves up and down in correspondence with the oscillation of the latch 20. Its downward motion is limited by the contact of the lower part of the T-shaped end of latch 20 with cam 17 on which it rests. Pin 30 is so located on the armature lever 28 that it cannot possibly get over the pin 24, even when pin 24 is at the lowest point of its drop. The nearest it could ever come to doing this would be to strike squarely against the pin 24. Pin 30 is, however, preferably sharpened somewhat at its outer end so that should it happen ever to strike against the pin 24 (which is by no means likely) it will meet the rounded or cylindrical surface of said pin 24, and this will help the pin 30 to slide under and lift pin 24. Or, to give another reason why there is no possibility of the pin 24 catching under the pin 30 when the magnet 26 is energized and the latch 20 oscillated, I may say that the cam 17 is so located on the shaft 11 with relation to the cam 41 that the magnet 26 can only be energized during certain positions in the oscillation of the latch 20. Considering this further, cam 17 causes latch 20 to move up and down, and cam 41 opens and closes the electric circuit at certain parts of the revolution of shaft 11. Referring to Fig. 5, it will be seen that when pin 24 is approaching its highest position, the cam 41 will close the main circuit by allowing springs 42 and 43 to come together, and will keep said main circuit closed during a quarter of a revolution of shaft 11, or until after the pin 20 has reached its highest position and descends again. Now at the moment the circuit is closed, if magnet 26 is operative, it instantly attracts its armature and throws the pin 30 forward; but at that moment pin 24 is sufficiently high to allow pin 30 to slide under it. Furthermore, the speed of pin 30 in making its movement forward is much greater than the movement of the pin 24 in going up or down, since the attraction of the magnet 26 causes its armature to move suddenly and quickly, throwing pin 30 forward under the pin 24 before the latter can drop too low.

In the lower part of the main frame a suitable distance below the latch 20, is an electro-magnet 35 having an armature 36 provided with a lever 37 hung pivotally at 38 on some part of the main frame, said lever 37 being provided near its upper end with a horizontal pin 39, which is adapted to engage with a horizontal pin 34 on the end of the latch 20, by projecting over said pin at certain times. Said pin 39 operates in conjunction with the pin 34 in a manner quite similar to the operation of the armature pin 30 in conjunction with the latch pin 24, and is effectual in locking the latch 20 in a certain position by advancing and staying over the pin 34, when the magnet 35 does not attract its armature 36, for when there is no such attraction, a spring 40 which is fastened to the armature lever 37, and also to some stationary part of the frame, operates to draw over the lever 37, and hence moves pin 39 into a position above the pin 34. Ordinarily when the machine is at rest the magnet 35 is energized and hence the armature 36 is attracted thereto, but manifestly during the operation of the machine this magnet 35, being in the main electric circuit, is subject to being frequently demagnetized and then energized again, and so it is to be observed that the pin 39 is so positioned that the lever 20 in its rise and fall will not strike its pin 34 against pin 39, there being normally a clearance of the two pins, and this operative relation obtains except when the main line is broken or battery power removed, at which time the magnet 35 is not promptly again energized after demagnetization as it is in the operation of the machine, as will be hereinafter more fully explained. When either of these things happens, the armature 36 will fall loose from the electro-magnet 35 under the power of the spring 40, and this will cause the pin 39 to slip over the pin 34, causing the latch 20 to be locked, after which obviously the shaft 11 cannot be rotated but must remain stationary so long as the latch 20 is locked. Hence it is evident that the shaft 11 is rendered inoperative by the breaking of the main line, or the destruction or imperfection of the battery. On said shaft 11 is securely fixed another cam 41, see Fig. 1, which has two high parts $a$ opposite to each other, and two low parts $b$ opposite to each other, the cam being made by using a circular disk and cutting out certain portions of the periphery to provide for the low portions of the cam, so that in this way the high parts constitute short arcs of a circle, and being thus made are able to exert the same influence on the part with which they come in contact for an appreciable length of time. The lengths of each of the high portions $a\ a$ and also of each of the low portions $b\ b$ are equal to each other, and each equal to one-quarter of the total periphery of the cam 41.

In convenient proximity to the cam 41 are two contact springs 42 and 43 securely fastened to the insulated support 44. These springs 42 and 43 are part of the main electrical circuit. They are provided, respectively, with platinum points 45 and 46 which are normally in contact with each other when the machine is at rest, and the spring 42, which projects nearer to the cam 41 than spring 43, is preferably provided with a small knob or its equivalent 47, which is wiped by each of the high parts $a\ a$ of cam 41 during the revolution of the latter, the result of this wiping contact being to deflect the spring 42 sufficiently to separate the pins 45 and 46 from each other, and thus make a break in the main circuit. Accordingly, it is clearly seen that when the shaft 11 is rotating, the main electrical circuit will be opened and closed in each revolution of this shaft by the breaking of the circuit caused each time the contact springs 42 and 43 are spread apart, and as the circuit breaks twice in each revolution of the shaft 11, it will be broken sixteen times in each revolution of the shaft 7 carrying the pointer 18, when it is remembered that the shaft 11 revolves eight times during one revolution of the shaft 7.

Returning in my description to the shaft 7, it is provided with a rigid crank arm 48 having an arc-shaped outer end, the arc being concentric with the axis of revolution of shaft 7, or the outer end of the crank 48 being T-shaped with a curved edge. This arm 48 coincides in position with the pointer 18, that is to say, it projects in the same direction, but being on the opposite side of the dial 19, and hence during the progress of the pointer 18 over the face of the dial 19, the crank 48 follows a corresponding movement behind the dial. In convenient proximity to the arm 48 as it rotates about its center of movement, are two flat springs 49 and 50 supported by attachment to an insulated block 51, carried by the main frame. These springs 49 and 50 are connected by suitable wires $c$ and $d$ to the springs 42 and 43, to which they are quite similar in construction and arrangement. Springs 49 and 50 are preferably furnished with suitable platinum or other contact points 52 which are normally out of contact with each other, and spring 49 is preferably provided with a small knob 53 which is wiped by the outer end of the arm 48, whenever said arm reaches that point in its revolution where it stands vertical and where the pointer 18 points to the lowest number in the scale 19, which in the present example is the number 15, or rather the space between the graduations 15 and the one next preceding it. The result of the arm 48 wiping the spring 49 momentarily is to cause the contacts 52 on these springs 49 and 50 to meet, and thus close the circuit which is normally open at this point. The arm 48 is so situated on shaft 7, and the cam 41 is so situated on shaft 11, that a proper timing in the operation of these parts will occur, so that the closing of the circuit through the bringing of the springs 49 and 50 together by the action of the arm 48, when the pointer is at a predetermined point in its movement around the circle, will take place simultaneously with one of the openings or breakings of the circuit through the separation of the springs 42 and 43 from each other in consequence of the action of cam 41. It is to be remembered, however, that the closing of the circuit by bringing the springs 49 and 50 together, occurs only once in the revolution of the shaft 7, and consequently in the rotation of the crank arm 48. The effect of this operation of closing the circuit by springs 49 and 50, which I have stated are electrically connected with the springs 42 and 43, is to neutralize or destroy one of the openings of the electrical circuit which takes place when the springs 42 and 43 are separated, so that during each series of eight resolutions of the shaft 11, which ordinarily would mean sixteen breakings of the electrical circuit, one breaking of the circuit is lost, for it does not take place at the moment when the arm 48 wipes against the knob 53 on the spring 49. Therefore, when shaft 7 makes one complete revolution, the electrical circuit would ordinarily be opened and closed sixteen times, because shaft 11 revolves eight times to one revolution of shaft 7 and shaft 11 opens and closes the circuit twice in each revolution, but the neutralizing of one opening of the circuit, as just explained, causes the circuit to be opened and closed fifteen times instead of sixteen times, and the interval that elapses between the opening immediately preceding the contact of arm 48 with spring 49, and the opening which occurs immediately after such contact is twice as long as the interval between the opening and closing of the circuit at other times. This causes a pause, as I term it, which is very noticeable to the attendant looking at the receiver dial of the machine and which enables the operator to perceive whether or not the machine is working properly and accurately, for it provides a method of testing or verifying the system. This is one of the important features of my present invention.

I have already stated that the large gear wheel 2 besides driving the pinion 8 on shaft 7 drives a pinion 12 on shaft 13, which pinion 12 has only half as many teeth as the pinion 8, so that while the shaft 7 makes one revolution, the shaft 13 makes two revolutions, and consequently remembering that the ratio of revolutions between shaft 7 and shaft 11 is 1 to 8, when the shaft 13 revolves once, shaft 11 will make four revolutions. This shaft 13 is suitably supported in the frame 1 as indicated in Fig. 3. At one side of the frame 1 there is provided a lateral extension 54 for the accommodation of shaft 13 and certain parts which I am now about to describe. On the end of the shaft 13 opposite to the pinion 12 is a bevel gear wheel 55 which engages two bevel pinions 56 and 57 carried by a shaft 58 which is at right-angles to and securely fastened to a shaft 59 which is in line with the shaft 13, and one end of which is supported in a bearing in the center of the bevel gear wheel 55 while the other is supported preferably by an adjusting screw 60 in the frame 54. See Fig. 3. Another bevel gear wheel 61 is mounted loosely on the shaft 59 and is provided with a hub 62 having thereon a gear wheel 63. The bevel gear 61 engages with the two bevel pinions 56 and 57 in like manner as does the bevel gear 55, though opposite thereto. This arrangement of gears provides a differential gear mechanism and enables the shaft 59 to be driven either separately or conjointly by means of the gear wheels 12 and 63, as will be hereinafter more fully explained. In the arrangement described and in order that the bevel gears may properly mesh into each other, those gears opposite to each other must have the same number of teeth, that is to say, gear wheel 55 has the same number of teeth as gear wheel 61, and pinion 56 has the same number of teeth as pinion 57.

The gear wheel 63 is engaged by a vertical rack bar 64, as indicated in Fig. 1, and more fully shown in Fig. 9. This rack bar 64 is connected to a rod 100, which extends into a suitable tank 101, wherein it is connected to a float 102 or other suitable similar device, which is acted upon by the gas pressure coming through the pipe 103 from the distributing mains, or other source, so that as the pressure of the gas or other fluid rises or falls, the rack bar 64, which will likewise rise or fall, will rotate the gear wheel 63 backward or forward, which in turn will drive the bevel gear wheel 61 and the differential mechanism. Though it is unnecessary to describe the tank here, inasmuch as its construction may vary widely, and whatsoever might be offered here would be given simply by way of illustration and suggestion, it is not amiss to state that as shown in Fig. 9, this tank may consist of the water-containing receptacle 101 in which is the small gas holder 102 mounted in suitable guides and having lateral anti-friction rollers 104 which play up and down on the inside surface of the receptacle 101. Inside of the gas holder 102 is a displacement chamber 105. The gas pipe 103 running from the mains or some other source, communicates, as shown, with the annular space between the holder 102 and the displacement chamber 105. The holder rises and falls directly proportionately to the pressure, and, as stated, reciprocates the rack bar 64 so that the pinion 63 may be actuated. On top of the tank 101 are preferably placed small rollers, 106, on each side of the rod 100 to facilitate the up and down movement of the latter.

On the shaft 59 there is also a disk 65, insulated on shaft 59, which disk has a notch 66 at one point in its periphery. The disk 65 revolves below a horizontal contact spring 67, one end of which is made fast while the other plays freely beneath and in relation to a contact screw 68, see Fig. 1. Spring 67 has a small projection consisting preferably of a little roller 69 which rides on the periphery of the disk 65, and normally is at rest in the notch 66. When the roller is thus in the notch 66, the end of the spring will be away from the screw 68 and the circuit at this point will be open. When, however, the disk 65 revolves more or less in one direction or the other, the roller will be lifted up out of the notch, which will cause the end of the spring 67 to make contact with the screw 68, and thus close the circuit. The notch 66 is of such a length that during one revolution of the disk 65, the circuit between spring 67 and screw 68 will be closed during fifteen-sixteenths of this revolution, and open during one-sixteenth part of the revolution.

From what I have already said, it must be evident that owing to the peculiar characteristics of a differential gear mechanism like that herein described and shown, the gear wheel 12 or the gear wheel 63 must make two revolutions to revolve the disk 65 once, it being remembered that the gear 55 has the same number of teeth as the gear 61, and the pinion 56 the same number of teeth as the pinion 57. The diameter of the gear wheel 63 is such that the rack 64 which engages the teeth of this gear must rise eight units in pressure to cause gear wheel 63 to make one revolution, and therefore it must rise sixteen units in pressure to cause the disk 65 to complete a single revolution; and furthermore the shaft 7 must revolve once to carry the disk 65 around once, provided the rack 64 and the gear wheel 63 remain stationary. If, however, while the shaft 7 is making one revolution, or a part of a revolution, the rack 64 should move up or down, (that is to say, if the pressure should change while the machine is in motion) then the shaft 7 will move a greater or less extent to bring the disk 65 around than if the rack and gear had not moved, and the amount which the shaft 7 loses or gains by reason of the rack and gear having moved, is equal to the number of points or units represented by the movement of the rack. It must also be clearly understood that a point pressure or one unit of movement up or down by the rack is represented by a half-revolution of the shaft 11 by one-sixteenth revolution of shaft 7, and by one opening and closing of the circuit at springs 42 and 43.

The pinion 12, shaft 13 and gear wheel 55 may be considered as forming together one member of the differential gear mechanism, inasmuch as these three parts are rigid with respect to each other, and must move conjointly. The gear wheel 61, gear wheel 63 and hub 62 together constitute a second member, since gear wheel 63 is mounted upon or driven tightly on to the hub of gear wheel 61, and they revolve loosely on the shaft 59. The gear wheel 56, gear wheel 57 and shafts 58 and 59 together constitute a third member, inasmuch as they operate conjointly. Gear wheels 56 and 57 revolve freely on the shaft 58 and they mesh as stated into the gears 55 and 61. The shaft 58 is at right-angles to shaft 59 and is rigidly connected thereto, so that shafts 58 and 59 move in unison with this exception, that while shaft 59 revolves shaft 58 moves around in a plane at right-angles to the axis of rotation of shaft 59. Shaft 59 has one end resting in the center of the gear wheel 55, as shown in Fig. 8, so that gear wheel 55 serves in part as a bearing for and a support for one end of the shaft 59. Now, if we assume the second member just specified, consisting of gear wheels 61 and 63 and hub 62, to be stationary, it must clearly follow that if the shaft 13 revolves, it will cause shaft 59 to revolve in the same direction, by reason of the gear wheel 55 causing the gear wheels 56 and 57 to revolve on the shaft 58. As the gear wheel 61 is now assumed to be stationary, the gear wheels 56 and 57 must travel around on the periphery of the gear wheel 61, carrying the shaft 58 around with them, that is to say, causing the shaft 59 to rotate in the same direction as the shaft 13. In this manner the gear wheel or pinion 12 can drive the shaft 59. Similarly, if we assume the first member just specified, consisting of pinion 12, shaft 13 and gear wheel 55, to be stationary, and the second member, consisting of the gear wheels 61 and 63 and the hub 62, to be movable, it will be seen for the reasons just stated that if gear wheels 61 and 63 are revolved, they will cause the shaft 59 to revolve in the same direction. Now, if both the shaft 13 and the gear wheel 63 are rotated at the same time, either in the same or opposite directions, the effect which they exert on shaft 59 will be a resultant effect of the motions imparted to it by the shaft 13 and the gear 63, that is to say, shaft 59 will either remain stationary or will rotate forward, or will rotate backward, in consequence with the resultant effect of the rotations of the shaft 13 and the gear wheel 63. If the shaft 13 and the gear wheel 63 are rotated in opposite directions at the same rate of speed, the shaft 59 will remain stationary because the effects imparted to it by shaft 13 and gear wheel 63 are equal and opposite, and neutralize each other, and nothing therefore happens except that the gear wheels 56 and 57 revolve on the shaft 58. If the shaft 13 and the gear wheel 63 rotate in opposite directions, but at different speeds, then shaft 59 will rotate in the direction of the one moving faster, and at a speed of or to an extent which is equal to half the difference of the speed of shaft 13 and gear wheel 63. For example, if in a given time shaft 13 makes two revolutions in a clockwise direction and gear wheel 63 makes one revolution in the opposite direction, the shaft 59 will make a half revolution in a clockwise direction. If shaft 13 and gear wheel 63 move at the same speed in the same direction, the whole system will rotate as one, that is to say, shaft 59 will rotate in the same direction at the same speed, and in this case the gear wheels 56 and 57 will not revolve on the shaft 58. If shaft 13 and gear wheel 63 move at different speeds in the same direction, the shaft 59 will rotate in the same direction at a speed which is equal to half the sum of the speeds of shaft 13 and gear wheel 63. For example, if in a given time shaft 13 makes two revolutions in a clockwise direction, and gear wheel 63 makes one revolution in the same direction, then shaft 59 will rotate one and a half revolutions in a clockwise direction. Assigning positive and negative values for forward or backward motion, it may be stated that the motion of shaft 59 is equal to half the sum of the motions of shaft 13 and gear wheel 63. The relative number of teeth in the gear wheels 56 and 57 and 55 and 61 is of no consequence, and does not enter into the motions which I have just described. The only bearing which such a relation has is in the number of revolutions which the gear wheels 56 and 57 make on the shaft 58, which is obviously immaterial for the requirements of this mechanism. Preferably the sizes or the number of teeth in the gears 56 and 57 are small because they are therefore lighter and cause less friction. Hence it will be understood from this analysis that the shaft 59 may properly be said to be driven either separately or conjointly by means of the gear wheels 12 and 63.

Proceeding now to briefly describe the receiver and referring to Fig. 5, it will be seen that it consists of an electro-magnet 70 having an armature 71 to which is attached an armature lever 72 pivoted at 73 and furnished at the end with forked detents 74, 74, which engage the teeth of a ratchet 75 on a shaft 76 carrying a pointer 77 vibrating over the face of a dial 78 which is marked with fifteen equal graduations which indicate pressure in like manner with the graduations on the dial 19 of the transmitter. The graduations on dial 78 are preferably numbered from 15 to 29. A spring 79 is connected to a stationary part of the frame and to the armature lever 72 below its pivot 73, and has the function of drawing the armature 71 away from the electro-magnet 70. 80 denotes a test key on a spring 81 which normally is in contact with screw 82. (By depressing the key 80 the main line can be broken or opened at this point.) If the electro-magnet 70 ceases to attract the armature 71 by reason of the breaking of the circuit, either at the test key 80 or by the operation of the transmitter mechanism, said armature 71 will drop away from the magnet 70 and this will cause the forked detent 74 to drive one of its teeth into the ratchet 75 while the other is withdrawn, and this will throw the ratchet wheel 75 forward half a tooth, and hence if the circuit of the electro-magnet 70 is broken once, that is to say, is opened and closed once, the pointer 77 is driven forward one-fifteenth of a revolution.

I will now begin to describe the operation, first assuming that the hand 18 on the transmitter dial 19 is in unison with the hand 77 on the receiver dial 78, that is to say, it points in each instance to a number representing the same pressure, and this is the pressure in the tank in connection with which the rack bar 64 operates. Under normal conditions, the transmitter is at rest with the roller 69 on the spring 67 lying within the notch 66 in the disk 65, as shown in Fig. 5.

Suppose now that the pressure in the transmitter tank, which is the pressure in the distant distributing main in city service, rises one unit, say, from 25 to 26. This will cause the rack 64 to lift and the gear 63 to make one-eighth of a revolution, which movement of the gear 63 will impart a one-sixteenth revolution to the disk 65 which will, therefore, shift from the position shown in Fig. 5 to that shown in Fig. 6. In so doing the disk 65 lifts the spring 67 and brings it into contact with the screw 68 and thereby short circuits the electro-magnet 26 without opening the main line. Immediately the armature 27 drops away from the magnet 26 under the tension of the spring 31, acting on the lever 28, and thus the pin 30 is withdrawn from the top pin 24 on the latch 20, and the T-shaped end of the latch allowed to fall, which takes away the latch pin 25 from its obstructive position in front of the crank pin 33 and gives the shaft 11 an opportunity to rotate, which it readily does. The instant, however, that the shaft 11 starts to move, the cam 41 opens the springs 42 and 43, thus temporarily breaking the main line, and then closes them together again. This opening and closing of the main line circuit does not affect the magnet 26, for it is already short circuited at spring 67 and screw 68, but it does cause the armature 36 of magnet 35 to recede from the magnet and immediately return to it again, causing the pin 39 to move into the path of pin 34, but this is so timed in consequence of the relative positions of pins 39 and 34 that pin 34 dodges or clears pin 39 without hanging up the latch 20. The opening and closing of the main line circuit also demagnetizes magnet 70, and then immediately magnetizes it again, thus causing the armature 71 to recede from and then return to said magnet, the result of which is to cause the forked detent 74 to drive the ratchet wheel 75 around for the distance of one tooth, so that the pointer 77 moves along one point on the dial 78, which would, for example, bring it up to the figure 26 on the dial. Before the shaft 11 has completed one-half of a revolution, however, the large gear wheel 2 which engages with the pinion 12 on shaft 13, will by actuating said pinon 12, cause through the differential gear device consisting of bevel gears 55 and 61 and bevel pinions 56 and 57, an action to take place upon the shaft 59 in a direction reverse of that caused by the previously-mentioned movement of gear wheel 63, so that the disk 65 will revolve back to its normal position which is shown in Fig. 5, where the roller 69 lies loosely in the notch 66. This, of course, stops the short circuit around magnet 26 by taking spring 67 out of contact with screw 68 and allows the magnet 26 to be magnetized again as soon as shaft 11 moves cam 41 far enough to permit the closing together of the springs 42 and 43, for then the magnet 26 instantly attracts armature 27, causing armature pin 30 to pass under latch pin 24 and give support to the latch 20, so that the shaft 11 will stop after it has completed one-half of a revolution. From this it is manifest that a rise in pressure of one unit from the twenty-fifth graduation to the twenty-sixth graduation has been properly transmitted by the transmitting mechanism to the receiver mechanism, and that the hand of the receiver 77 has indicated to the attendant at that point the change in pressure at the distant station, because the hand 77 has moved up on the receiver dial from the twenty-fifth graduation to the twenty-sixth graduation, while also the pointer 18 on the transmitter dial 19 has moved one-sixteenth of a revolution and passed from the twenty-fifth graduation to the twenty-sixth graduation. In this connection, an important thing is to be noticed, viz: that the rack 64 which first sustains the influence of a change of pressure either up or down, and is the first element to be disturbed thereby, is capable of driving the disk 65 in one direction or in the other, in one direction as shown in Fig. 6, in another direction as shown in Fig. 7, because the rack rotates the gear 63 either backward or forward, but the pinion 12 can only drive the disk 65 in one direction which is preferably a forward direction, or what is termed clockwise, being in the same direction as the movement of the hands of a clock. Of course I do not mean to restrict myself to having the disk 65 always moved by pinion 12 in a clockwise direction, but what I do mean to say is, that it is always moved in the same direction when acted on by the pinion 12, and though the machine may be organized so that this movement will be contra-clockwise, yet the reorganization of the moving parts in this case would have to be considerable to permit this.

Continuing the explanation, I will now assume that the pressure in the tank at the transmitter end of the apparatus where the rack 64 is located, drops a unit, that is to say, goes down from 26 to 25. The rack 64 will consequently drop a point and this will through the connection with the gear 63 revolve the disk 65 into the position shown in Fig. 7. This movement lifts the spring 67 into contact with the screw 68, and a short circuit is established around the electro-magnet 26 as indicated in Fig. 5, which as before explained in the case of an increase of pressure will unlock the shaft 11 and allow it to revolve. Also as before explained, the pinion 12 on the shaft 13 will be set in motion, and through the action of the differential gear mechanism, the disk 65 will be rotated forwardly in the direction of the arrow shown in Fig. 7 (not backwardly) until the disk has completed the revolution and the notch 66 again receives the roller 69, as shown in Fig. 5. All the while during this complete revolution, the spring 67 is kept in contact with the screw 68, and the magnet 26 is short-circuited. Of course, as soon as the roller 69 again drops into the notch 66 at the end of the revolution of the disk, the magnet 26 is again magnetized at the next closing of the springs 42 and 43, resulting in the stopping again of the shaft 11. During all this time the disk 65 has moved through fifteen-sixteenths of a revolution, it being remembered that the notch 66 is one-sixteenth of a revolution; and the shaft 11 has revolved seven and one-half times, and the contact springs 42 and 43 have been opened fifteen times, although the effect of one of these openings has been canceled by the closing of the springs 49 and 50, so that the main line circuit has really only been opened fourteen times. These fourteen openings or breakings of the main line circuit have caused the mechanism of the receiver to correspondingly operate the ratchet wheel 75, inasmuch as fourteen operations have been given to the magnet 70, and to the forked detent 74 which has caused the pointer 77 to move around through fourteen divisions, thus bringing it to the twenty-fifth indication on the graduated circle. At the time when the springs 49 and 50 are closed, the verification pause occurs in the movement of the receiver pointer, when it is at the graduation 15 on the receiver dial.

If it should happen that while the transmitter is operating, and the circuit opening and closing fourteen times in the manner I have just explained, the pressure in the tank should rise or fall, this rise or fall is communicated to the disk 65 through rack 64 and gear 63, and this either delays or hastens the disk 65 in its revolution, which has the effect of adding or subtracting one or more revolutions of the shaft 11, the resultant effect being that the necessary number of impulses are sent to cause the receiver at the time when it stops moving to indicate accurately the pressure which is being registered at the transmitter.

In case the attendant at the receiver wishes to verify the accuracy of the indication which is being made at any certain time by the pointer 77, in other words, if he wishes to test the reliability of the machine, all he has to do is to open the main circuit for a moment by depressing the key 80, thereby removing the spring 81 from the contact screw 82, and then release the key 80 and let the spring 81 again contact with the screw 82 which will close the circuit again. Immediately upon the breaking of the circuit, the armature 27 will be removed from the electro-magnet 26, and consequently the shaft 11 will begin to revolve, which will cause the disk 65 to begin to move into the position shown in Fig. 7, where the roller 69 is removed from the notch 66 and the disk being started in the direction of clock-hands must complete a revolution before it stops. Hence the disk 65 will keep moving until the notch 66 comes around again and once more receives the roller 69 on the spring 67. The machine therefore now opens and closes the circuit fourteen times as before explained, but the attendant in depressing the key 80 opened and closed the circuit once which makes fifteen times in all which brings the pointer 77 around to the same point where it was before. The verification pause was also given at the time when the springs 49 and 50 were brought together simultaneously with one of the openings of the circuit at 42 and 43, a thing which occurred at the moment that the hand 77 was on the zero point or the lowest graduation of the scale. This proves that the pointer 77 is in unison with the shaft 7, the position of which is usually indicated by a pointer, as 18, and which position of shaft 7 is in unison at all times with the pressure in the tank. Thus it will be understood that the attendant at the receiver has a way readily available at all times for verifying the correctness of the receiver indications.

When the main line is broken, or the battery or batteries are for any reason put out of commission, the electromagnet 26 belonging to the transmitter, will cease to attract its armature 27 and this will cause pin 30 to withdraw from under the pin 24, thus allowing the T-shaped end of latch 20 to descend and unlock shaft 11, allowing it to start in motion as previously explained. However, the breaking of the circuit or removal of battery power has also affected the magnet 35, causing it to release its armature 36. This causes pin 39 to advance towards pin 34. As the armatures 27 and 36 are released simultaneously, it is clear that pin 30 starts to withdraw from under pin 24 at the same instant that pin 39 advances towards pin 34. The length of pin 30 and the distance between pins 39 and 34 are so adjusted that pin 30 withdraws its support from pin 24 before pin 39 has advanced over pin 34. This allows pin 25 to pass below pin 33 and unlock the shaft 11 before pin 39 has a chance to hold latch 20 by advancing over pin 34. The shaft in starting, causes the T-shaped end of latch 20 to rise again almost immediately by reason of the shape of cam 17, and bearing in mind the shape of this cam 17 it is clear that the motion of pin 34 after the circuit has been broken is to rise instantly, then gradually to descend, and then rise again by a sudden and quick motion. In rising thus, it strikes against pin 39 which by this time has advanced across its path and remains there. This prevents pin 34 from rising any higher and thus hangs up latch 20, causing pin 25 to obstruct the path of the next pin 33, stopping and locking the shaft 11 after it has made but one-half revolution, and this position of the parts will obtain and remain as long as the circuit is broken or battery power removed. At the same time, the receiver magnet 70 releases its armature 71 and does not attract it again while the line is broken, a condition which moves the ratchet wheel 75 forward the distance of half a tooth and not the whole distance, and hence causes the pointer 77 to assume a position intermediate between two consecutive divisions. Therefore it is evident that whenever the receiver pointer instead of pointing directly to one of the scale numbers is between two of the divisions, there is something wrong. If the attendant upon glancing at the receiver dial sees the pointer at any time in this mid-position, it is evident to him that the apparatus is not working, and steps should be promptly taken to ascertain the cause. Upon testing with the test-key 80, the attendant would find that the hand does not move as it usually does when such a test is made. If the pressure at the transmitter changes while the line or the battery is out of commission, the rack 64 will be moved up and down by the pressure as usual, and the gear 63 will as usual move the disk 65 forward or backward lifting the spring above the peripheral notch, and causing the customary short-circuit of the magnet 26, but as soon as the line or battery is restored the transmitter mechanism will immediately begin to operate, and the disk must of necessity be carried back into its normal position, where its notch receives the roller 69, whereby the shaft 11 is revolved around the necessary number of times to bring the receiver pointer 77 so that it will be in unison with the pressure existing at the transmitter and indicated at the time by the transmitter pointer 18. Thus it will be seen that no resetting or calibration is necessary after the integrity of the line is restored, and this proves that the system or machine constituting my invention is able to take care of itself automatically not only while the line is in perfect order but also promptly upon its restoration to good conditions after a suspension of service.

I will offer a word or two with reference to the first adjustment of the parts at the first installation of the apparatus or at any future time when the receiver might be disconnected for repairs, etc. We assume that the arm 48 of the transmitter is directly behind the dial graduation which represents the pressure in the tank. The line is opened by depressing the test-key, as 80, and then the pointer of the receiver will immediately start forward and work its way step by step completely around the circle. The point at which it makes the pause should be noted. For the sake of illustration suppose it is 19. This indicates that the machine is four points fast, for the pause should occur at 15, the lowest point on the scale, that is to say the zero point of this particular form of scale which I am assuming is graduated from 15 to 29. The hand is therefore set back four points by moving it on its shaft, on which it is mounted friction-tight like a clock hand. On testing again with the test-key, it will be found that the pause occurs at the proper point, which is the lowest point, which shows that the machine is now set correctly and in unison with the transmitter.

I do not wish to be restricted to this method of adjusting or testing the apparatus, and reserve the liberty of doing it in any other desired manner.

The range of the transmitter described herein is 15 points or 15 units pressure, that is it can transmit pressure indications of 15 units above the lowest unit to which the arm 48 and pointer 18 on shaft 7 may be set. This range may obviously be increased or decreased to suit the particular requirements or range of pressure for which the transmitter is used. The following relations must always be preserved in the proportions of the various gears to each other. The gear 12 must always have half the number of teeth of the gear 8 no matter what the range is. Denoting the number of points or units in the range as "$x$" and the number of times the circuit is opened at contacts 42 and 43 and obliterated or closed at contacts 49 and 50 as "$y$," the number of teeth required in gear 10 must be the number of teeth in gear 9 divided by the quantity $\frac{x+y}{2}$. The number of teeth in gear 63 must be such that it will make one complete revolution when the rack travels $\frac{x+y}{2}$ units of pressure. The notch in disk 65 must be of such a length, that the contacts 67 and 68 will be closed while the disk 65 makes $\frac{x}{x+y}$ part of a revolution and open while it makes $\frac{1}{x+y}$ part of a revolution. At the receiver, the number of teeth in the ratchet wheel 75, must equal $x$ and the number of graduations of the dial must obviously be the same.

It is clear that the value assigned to "$y$" determines the length of duration of the verification pause hereinbefore described, and the length of the outer edge of the arm 48 must be sufficient to permit of the desired number of obliterations. In the mechanism herein described, one opening of the circuit is obliterated and the pointer 77 of the receiver makes but one step at the pause in the time it ordinarily consumes in making two steps.

I have already said that the function of the magnet 26 is to control the movement of the shaft 11 by starting and stopping it at the proper time, and that this magnet is rendered inoperative or operative by the position of the disk 65 having notch 66 receiving the roller 69 carried by the spring 67. While the roller 69 is in the notch 66, as shown in Fig. 5, the shaft 11 is at rest and locked, and obviously this is the normal position of the parts; but whenever the disk is moved in one direction, as shown in Fig. 6, or in the opposite direction, as shown in Fig. 7, as already explained, the magnet 26 is short-circuited and the shaft 11 instantly released and allowed to revolve until the disk 65 gets back into its normal position again, which is accomplished automatically. In thus automatically returning the disk 65 to its normal position through the agency of the control magnet, the shaft 11 is caused to make in one case more revolutions than in the other, for example, suppose the disk 65 is changed from the position shown in Fig. 5 to that shown in Fig. 6, which takes place when the pressure increases a single unit or more. It will then be evident that the shaft 11 will necessarily make but one-half a revolution to permit the gear wheel 2 to drive the pinion 12 sufficiently to cause the differential gear mechanism to move disk 65 in a clockwise direction through one-sixteenth of a revolution back into its normal position. Suppose, however, that the disk 65 changes from the position shown in Fig. 5 to that shown in Fig. 7, which takes place when the pressure falls one unit, then the shaft 11 must revolve seven and one-half times in order to transmit to the disk 65 a clockwise movement through fifteen-sixteenths of a revolution which is the amount necessary to rotate the disk to its normal position. Hence it must be understood tht when the control magnet is energized it will stop the shaft 11 and prevent motion but when it is demagnetized the shaft 11 is set free and allowed to revolve.

Suppose the gas pressure increases or rises a unit, this increase is immediately transmitted by the rack 64 to the gear wheel 63, which through the differential gearing operates shaft 59 and shifts the disk 65 into the position shown in Fig. 6, lifting the roller 69 out of the notch 66, closing the contact spring 67 against the screw 68, thus short-circuiting the magnet 26 and setting free the shaft 11, so that the machine which has been normally at rest is put into motion, and the main line circuit is opened momentarily and then closed. This operation is performed once at this time, as the increase in pressure is assumed to be only one point. However, if the pressure had increased two points or three points, the operation would be repeated in succession and the circuit opened and closed twice or three times, or as many times as the pressure increases units. When the reverse action takes place, however, and the pressure decreases a unit, the machine will open and close the circuit fourteen times, for the characteristic of the mechanism which operates the disk 65 is as we have seen to always move it in a clockwise direction. In case the pressure should decrease two units in succession, the circuit would then be opened and closed thirteen times, or if the pressure decreases three units, the circuit opens and closes twelve times, and so on, at all times the number of openings and closings of the circuit being equal to the number of units pressure decrease deducted from 15. Moreover, if the circuit is opened and closed again at any point on the line, as, for instance, at the test-key 80 at the receiver, the machine immediately starts to operate and opens and closes the circuit fourteen times in succession. This number 14 plus the 1 time made by depressing the key, makes the 15 operations already spoken of in describing the receiver.

The magnet 35 acts in a manner the direct opposite of that of the magnet 26. Whereas the magnet 26 unlocks the cam-carrying shaft 11 when it is demagnetized, the magnet 35 unlocks the said shaft when it is magnetized; and when its current is cut off, this magnet 35 causes the shaft 11 to stop, subject, however, to the control which the control magnet exercises over shaft 11. The magnet 35 is, therefore, an emergency magnet, its principal function being to stop the shaft 11 after it has made a half revolution and prevent its further motion in the event of the supply of current to the transmitting machine being cut off, which might be caused by the main circuit becoming broken, by the battery becoming inoperative, or by a short circuit occurring between the transmitter and the battery, which would deprive the transmitter of current. If any one of these contingencies should happen to arise and the control magnet should in consequence become inoperative, the shaft 11 being left free would revolve indefinitely until the weight had run down, and this is what I wish to avoid by the use of the emergency magnet 35, and I do so in the manner just explained, for the magnet 35 when demagnetized locks the shaft 11. That is to say, when the same condition takes place which destroys the function of the control magnet and unlocks the shaft 11, this same condition enables the emergency magnet to perform its function of locking the shaft 11 and stopping its motion, so that consequently, after it makes but one-half of a revolution, should any one of the contingencies mentioned take place, the control magnet will instantly unlock shaft 11 which will start to revolve, but the action of the emergency magnet in stopping the shaft is so timed or regulated as previously explained that it is purposely delayed so that it is not possible for it to stop shaft 11 until after it has made one-half of a revolution. This delay is accomplished by having the relative positions of the pins 39 and 34 so adjusted, and the pin 39 of such a length that it will not pass over the pin 34 and operate to lock the latch 20 and stop the shaft 11, until after the latter has made a half revolution. This may be understood better by assuming for the sake of illustration, that the pin 39 is of such a length that while the armature 36 is attracted to the magnet 35, the left end of this pin 39 will reach almost to the pin 34 so that if the armature 36 be released the spring 40 would draw the pin 39 over the pin 34 before it had a chance to lift and unlock the shaft 11. If such were the case, should the circuit be opened outside the transmitter, the armature 27 would instantly recede from the control magnet 26 and allow the left end of latch 20, if free, to fall and unlock shaft 11; but this would not happen because the instant the circuit was opened, armature 36 would recede from magnet 35 and cause pin 39 to advance over pin 34, thus preventing the left end of the latch 20 from falling and unlocking shaft 11. By adjusting the distance between the pins 39 and 34, I am able when the armature 36 is attracted to the magnet 35, to delay the action of pin 39 and stop the shaft 11 by passing pin 39 over pin 34, and it is found in experience necessary to have this distance between the two pins so adjusted that if the circuit should be opened, for instance by depressing the test-key 80 at the receiver station, the pin 39 will not act to stop the shaft 11 by advancing over the pin 34, until after the shaft 11 has made one-half of a revolution.

In the operation of my improved machine for transmitting pressure indications, it is to be noted that it is normally at rest except when a change in pressure takes place, at which time the shaft 11 is released, which results in the transmission of the proper impulse to the receiver end, after which the shaft 11 is stopped and held at rest until the next change in pressure takes place. Evidently while the machine is in the normal condition of rest the continuity of the main circuit through the machine must be preserved. It is therefore necessary that the cam 41, which is insulated on shaft 11, should have a definite position relatively to the double cam 17, such relation being of such a character that when the machine is normally at rest with the shaft 11 locked, the cam 17 must be so placed on shaft 11 that the knob 47 of the contact spring 42 will rest opposite to the low part b of the periphery of the cam and not in contact with either of its high parts a, wherefore the spring 42 will keep its contact 45 against the contact 46 of spring 43, and thus preserve the continuity of the circuit at that point, while the beginning of the adjacent high part a of the cam 41 must be close to the said knob 47 so that the instant after shaft 11 is unlocked and starts to rotate, the circuit will be opened at springs 42 and 43, and will be closed again after shaft 11 has made one-quarter of a revolution. At this point of the revolution of the shaft 11, the latch pin 24 has now lifted sufficiently high to allow the pin 30 to advance under it should magnet 26 become operative, which explains the necessity for having the circuit closed at springs 42 and 43 after the shaft 11 has made a quarter revolution. We have already seen that if the main circuit should become inoperative, the magnet 35 acts to hold the shaft 11 after it has made one half revolution and the machine is left at rest and ready to respond to the effect of the current when the integrity of the circuit has been restored when it will immediately start in motion until the disk 65 reaches the normal position. Should the circuit become inoperative again before the notch in disk 65 reaches the normal position, the magnet 35 would act again to stop and hold shaft 11 so that the resultant effect of such interruptions of the main circuit would be merely to delay the transmission of the proper signals and the operations of the receiver magnet 70 would in all cases be such as to keep the pointer 78 in unison with the pointer 18 on shaft 7 when the circuit is in its normal condition. It is therefore evident that the magnet 35 besides acting in an emergency capacity to prevent the transmitter running down when deprived of current also acts to preserve the synchronism existing between the transmitter and receiver, even after temporary absences of current and variations of pressure at the transmitter during such interruptions which is an important and valuable feature of the operation of the machine.

Very many modifications may be made in the invention without departing from the same. I have shown the shaft 3 as projecting through the frame 1 and provided with a screw-threaded end for the application of a winding key wherewith to wind up the drum and its weight, but this may be modified and other winding devices employed. In fact, I reserve the liberty of varying the combination and relation of parts, and changing the same in form and function, without transcending the limits of my protection by Letters Patent.

Having thus described my invention what I claim as new and desire to secure by Letters-Patent, is:—

1. In a gage or indicator, the combination of a single electrical circuit, normally closed during the interval between changes or variations of the thing to be indicated, and having an impressed electromotive force of unchanging polarity, said electromotive force and the resistance being normally constant and invariable, a transmitting means operated by changes in the thing to be indicated, a receiving means operated by impulses from the transmitter and synchronously therewith, said receiving means having visual indicating means, together with means whereby the indicating means has a verification pause.

2. In a gage or indicator for indicating pressures at a distance, the combination of a single electrical circuit, normally closed and having a current of unchanging polarity, a transmitting device wherein the circuit is opened and closed by pressure fluctuations, a receiving device operated by impulses from the transmitter and synchronously therewith, said receiving device being provided with indicating means, together with means whereby the indicating means has a verification pause.

3. In a gage or indicator for indicating pressures, the combination of an electrical circuit, a transmitting device wherein the circuit is opened and closed by pressure fluctuations, a receiving device provided with indicating means and operating synchronously with the transmitter, together with means whereby the indicator has a verification pause.

4. In a gage or indicator, the combination of an electrical circuit, a transmitting device in said circuit actuated by pressure fluctuations to open and close the latter, a receiver device having means for indicating these changes of pressure and operating synchronously with the transmitter, together with means whereby the indicator delays its movement at a certain point to provide an accuracy test.

5. In a gage or indicator, the combination of a single electrical circuit normally closed and having a current of unchanging polarity, a transmitter operated by changes in the thing to be indicated, a receiver operated by impulses from the transmitter, and means whereby the position of one impulse in a series of impulses is made variable with respect to the others.

6. In a mechanism for transmitting indications, the combination with a receiver, of a transmitter in the circuit therewith consisting essentially of an electromagnet, a cam-carrying shaft, a latch controlling the shaft and itself controlled by the magnet, an operating disk, and means actuated thereby for short-circuiting the magnet, means whereby variations in the pressure of fluid or thing under observation are transmitted to the disk, and means for restoring the disk to its normal condition and simultaneously actuating the cam-carrying shaft, and means operated by said shaft to open and close the circuit at intervals, substantially as described.

7. In a mechanism for transmitting changes of pressure and the like, the combination with an indicator, of a transmitting device for sending electrical impulses to the indicator in correspondence with fluctuations of pressure and the like, said transmitter consisting essentially of an electro-magnet, a cam-carrying shaft controlled thereby and having thereon a circuit-breaking cam, a latch-releasing cam and a detent, a disk for controlling the magnet circuit, means whereby changes of pressure move the disk in one direction or the other, and means for restoring the disk to its normal position by revolving it always in the same direction.

8. In a mechanism for transmitting electrical impulses to indicate changes of pressure or the like, the combination of a transmitter and a receiver in the same circuit, said receiver being distant from the transmitter and indicating changes of pressure as received from the operation of the transmitter, and said transmitter consisting essentially of an electro-magnet, a cam-carrying shaft controlled by the magnet, means for performing said control, said shaft itself controlling the breaking of the circuit, means whereby the fluctuations of pressure or the like magnetize and demagnetize the magnet, means for restoring the latter means to a normal condition after each change of pressure, and means for actuating the cam-carrying shaft, the same including means for neutralizing one of the breaks in the circuit so that a longer interval occurs at one point.

9. In a gage for indicating pressures, the combination with a receiver which indicates the reproductions of the changes taking place at the transmitter, of a transmitter in the circuit with the receiver consisting essentially of an electro-magnet, a cam-carrying shaft controlled thereby, means for performing said control, said shaft itself controlling the opening and closing of the circuit, a disk and means actuated thereby operating to magnetize and demagnetize the magnet, means whereby said disk is controlled by the pressure fluctuations, and a mechanism including a differential gearing for restoring the disk to its normal position after each movement, together with a clockwork mechanism.

10. In a gage for indicating changes of pressure, the combination with a receiver which indicates the changes transmitted, of a transmitter consisting essentially of an electro-magnet adapted to be energized and demagnetized, mechanism controlled by the magnet for opening and closing the circuit, a disk together with contacts controlled thereby for short-circuiting the magnet, means whereby the pressure fluctuations shift the disk in one direction or the other, and means for restoring the disk to its normal position consisting essentially of a differential gearing, and a clockwork mechanism.

11. In a gage for indicating pressures, the combination of a receiver which indicates the changes of pressure, and a transmitter whose mechanism includes a disk movable in one direction or the other by changes of pressure but always revolving in the same direction while being restored to the normal, means for performing said movement of the disk, an electro-magnet whose circuit is controlled by the disk, a cam-carrying shaft controlled by the magnet and itself controlling the breaking and closing of the circuit, and a latch device arranged in conjunction with the cam-carrying shaft to regulate the movement of the same.

12. In a gage for indicating fluid or liquid pressures at a distance, the combination with a single electrical circuit, normally closed during the interval between changes or variations of the thing to be indicated, and having an impressed electromotive force of unchanging polarity, said electromotive force and the resistance being normally constant and invariable, a transmitter which gives electrical impulses, said transmitter being operated by changes in the thing to be indicated, and a receiver operated by the impulses from the transmitter, said receiver having a pointer and a scale.

13. In a gage for indicating pressures and the like at a distance, the combination of an electrical circuit including a transmitter control-magnet and a receiver-magnet, a disk which is moved backward or forward in correspondence with the changes to be indicated, means actuated by the disk, said disk and means actuated thereby, controlling the circuit of the transmitter control-magnet, means for restoring the disk to normal after its operation, a device whereby the impulses transmitted to the receiver-magnet are interpreted to the attendant, means controlled by the transmitter control-magnet for opening and closing the circuit for a succession of intervals, and means whereby one of these openings is neutralized so as to lengthen one interval.

14. In a mechanism for indicating changes of pressure or the like at a distance, the combination of a main line and a receiver at the far end, of a transmitting mechanism comprising essentially an electro-magnet, a cam-carrying shaft, means operated by said shaft for opening and closing the circuit, a disk actuated by the changes of pressure, means actuated by the disk for controlling the energizing of the magnet, and an emergency magnet whose function is to lock the cam-carrying shaft at times, and means coöperating with the emergency magnet in the performance of its function.

15. The combination of an electric line, a receiver at one end thereof, and a transmitter consisting essentially of a control magnet and its armature, a latch operating in conjunction with the armature, a cam-carrying shaft having thereon a latch-lifting cam, a circuit-breaking cam, and a detent, contacts in the electrical circuit adapted to be opened by the circuit-breaking cam, a disk operated by the changes of the thing to be indicated and communicating its movement electrically to the magnet so as to control the energizing of the latter, and a suitable mechanism for running the cam-carrying shaft and the disk, and a pair of contacts arranged to be closed by the operation of the mechanism simultaneously with one of the openings of the circuit by the circuit-breaking cam so as to destroy the effect of one of the openings and provide a longer interval.

16. In a gage or indicator, the combination with a receiver which indicates the impulses transmitted, of a transmitting mechanism consisting essentially of a control-magnet, means operated thereby for opening and closing the circuit a series of times, a disk controlling the circuit through the magnet and operated by the pressure fluctuations, an actuating mechanism for the disk and the circuit-breaking means controlled by the magnet, and means for neutralizing one of the openings in the circuit to provide a longer interval at one point.

17. In a gage or indicator, the combination with a main line, a receiver which indicates the impulses transmitted, of a transmitting mechanism consisting essentially of a control-magnet, means operated thereby for opening and closing the circuit a series of times, a disk and means actuated thereby controlling the circuit through the magnet and operated by the pressure fluctuations, an actuating mechanism for the disk and the circuit-breaking means controlled by the magnet said actuating mechanism including differential gearing, means for neutralizing one of the openings in the circuit to provide a longer interval at one point, and an emergency magnet provided with locking means for rendering the circuit-breaking means temporarily inoperative.

18. In a gage or indicator, the combination with a receiver having a pointer, of a transmitter for sending impulses to the receive, said transmitter consisting essentially of a control-magnet, circuit-breaking means controlled thereby, a disk controlling the circuit through the magnet, means whereby the pressure fluctuations actuate the disk, a driving mechanism for revolving said disk and restoring it to the normal, the latter revolution being always in the same direction, and said driving mechanism running the circuit-breaking mechanism and being provided with means for neutralizing one of the breaks of the circuit, a dial and its pointer arranged to be operated by the driving mechanism synchronously with the operation of the receiver pointer, and an emergency magnet for controlling the circuit-breaking means and stopping it when the line is broken or the battery out of order.

19. In a gage or indicator for showing changes of pressure of gas or other fluid or liquid, the combination with a receiver having an indicator, of means for transmitting impulses to the receiver correspondingly with the following fluctuations of pressure, said means consisting of a weight-driven gearing, a control-magnet, an armature therefor, an arm for which the said armature serves as a latch, a cam-carrying shaft and means actuated thereby arranged to open and close the circuit, a disk adapted to shift in one direction or the other by the fluctuations of pressure, means for shifting the disk, connections between the disk and the drive gearing consisting essentially of a differential gearing for restoring the disk to the normal by movement always in one direction.

20. In a gage or indicator for indicating pressures at a distance, the combination of a single electrical circuit, normally closed and having a current of unchanging polarity, a transmitting device wherein said circuit is opened and closed by positive or negative pressure fluctuations, a receiving device operated by impulses from the transmitter, said receiving device having visual indicating means, together with means whereby the indicating means has a verification pause.

21. In a gage or indicator for indicating variations at a distance, the combination of a single electrical circuit, a transmitting device operated by changes in the thing to be indicated, means whereby the fluctuations or variations of the thing to be indicated open and close the circuit, and a receiving device operated by impulses from the transmitter and provided with indicator means whose movement is always in one direction and includes a graduated circle over which the indicator means moves.

22. In a gage or indicator for indicating variations at a distance, the combination of a single electrical circuit, a transmitting device operated by changes in the thing to be indicated, means whereby the fluctuations or variations of the thing to be indicated open and close the circuit, and a receiving device operated by impulses from the transmitter and provided with indicator means whose movement is always in one direction and includes a graduated circle over which the indicator means moves, together with means whereby the indicating means has a verification pause.

23. In a gage or indicator for indicating variations at a distance, the combination of a single electrical circuit, a transmitting device operated by changes in the thing to be indicated, means whereby the fluctuations or variations of the thing to be indicated open and close the circuit, a receiving device operated by impulses from the transmitter and provided with indicator means whose movement is always in one direction and includes a graduated circle over which the indicator means moves, and means whereby the indicating means delays its movement at a certain point to provide an accuracy test.

24. In a gage or indicator for indicating variations at a distance, the combination of a single electrical circuit, a transmitter operated by changes in the thing to be indicated, means whereby the fluctuations or variations in the thing to be indicated open and close the circuit, a receiving device operated by impulses from the transmitter and provided with visual indicating means, one movement of the indicator being of a different character from the others and having a certain predetermined significance.

25. In a gage or indicator, the combination of a transmitter operated by changes in the thing to be indicated, a receiver, and means whereby said receiver operates synchronously with the transmitter in such a manner that a unit change in one direction is indicated at the receiver by one impulse, and a unit change in the other direction is indicated by a number of impulses equaling the total number of variations possible to indicate less one, together with means whereby the position of one impulse in a series of impulses is made variable with respect to the others.

Signed at New York city this 20th day of April 1906.

JAMES S. KENNEDY.

Witnesses:
JOHN H. HAZELTON,
H. L. ROCKWELL.